United States Patent Office 3,291,774
Patented Dec. 13, 1966

3,291,774
POLYCARBONATES FROM DIPHENOLIC ACIDS
Nicholas C. Bolgiano, Manor Township, Lancaster County, Pa., assignor to Armstrong Cork Company, Lancaster, Pa., a corporation of Pennsylvania
No Drawing. Filed Oct. 7, 1960, Ser. No. 61,082
4 Claims. (Cl. 260—47)

This invention relates to a novel method for the preparation of polycarbonates and to the polycarbonates thus produced. More particularly, this invention relates to the preparation of alkali-soluble polycarbonates by a polymerization process employing an aqueous alkaline solution.

Polycarbonates have been prepared by condensing bisphenols, such as 2,2-bis(4-hydroxyphenyl) propane, and diphenolic acid esters, such as 4,4-bis(p-hydroxyphenyl) pentanoate, with phosgene or bischloroformates in organic solutions and by interfacial polymerization methods. However, when attempts have been made to form the polycarbonates by employing only water as the reaction medium, the resultant condensation products were unsatisfactory, gummy, low molecular weight materials.

The primary object of the present invention is to provide a method whereby hard, tough polycarbonates may be prepared in an aqueous reaction medium.

A second object of this invention is the production of tough polycarbonates which are alkali soluble.

Still another object of this invention is the preparation of novel polymer products by the condensation of diphenolic acids with phosgene or bischloroformates in an aqueous alkaline reaction medium.

These and other objects have been accomplished by condensing diphenolic acids with phosgene or bischloroformates, preferably in a mol-for-mol ratio. Alkali-soluble polycarbonates are also prepared in accordance with this invention wherein up to 95 mol percent of the diphenolic acid is substituted by other bisphenolic compounds wherein the bisphenols are free from reactive groups other than the two phenyl hydroxy radicals under the conditions of the reaction. In the practice of this invention, the hydroxide ion concentration is maintained within certain well-defined limits during the reaction. Thus, to achieve a hard, tough polycarbonate which is alkali soluble, the reaction medium is maintained at a pH of form about 10–11 during the condensenation by the addition of a solution of sodium hydroxide or potassium hydroxide. During the reaction, the temperature of the reaction medium is maintained within the range of 5°–40° C. and preferably the reaction is carried out at a temperature of about 25° C.

Diphenolic acids which may be employed in the practice of this invention are represented by diphenolic acids of the following formula:

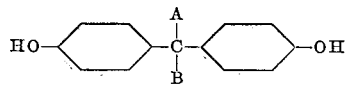

where A is a member selected from the class consisting of —H and alkyl radicals, and B is a member selected from the class consisting of —COOH and —RCOOH where R is an alkylene radical which may contain up to 8 or 10 carbon atoms with either normal or branched chains. The diphenolic acids may initially be prepared by the condensation of phenol with such materials as levulinic acid, pyruvic acid, and acetoacetic acid. Typical diphenolic acids which are useful as starting materials are 4,4-bis(p-hydroxyphenyl) pentanoic acid, 3,3-bis(p-hydroxyphenyl) butyric acid, and 2,2-bis(p-hydroxyphenyl) propionic acid.

The diphenolic acids are reacted with phosgene or bischloroformates of the formula

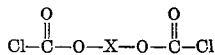

The bischloroformates are free from reactive groups other than the chloroformate groups under the conditions of the reaction and are particularly well adapted for the practice of this invention. Thus, in the bischloroformates contemplated by this invention, the chloroformate groups are the sole reactive groups capable of reacting with the hydroxyphenyl groups under the conditions of the reaction. The bischloroformates which are reacted with the diphenolic acids may be obtained by reacting phosgene with a diol, such as ethylene glycol, trimethylene glycol, and 1,4 butanediol. Other glycols wherein the alkylene chain contains a greater number of carbon atoms which may be a straight or branched chain are also satisfactory, and the X in the above formula may represent a carbon chain or a cyclic organic radical, which may be interrupted by hetero-atoms or hetero-atom groups. Examples of such dihydroxy compounds are ethylene glycol, 1,2 propylene glycol, 1,3 propylene glycol, 1,2 butylene glycol, 2,3 butylene glycol, pentanediols, hexanediols, diglycols, thiodiglycols, and cyclohexanediols. When using phosgene, the amount of phosgene admitted to the solution is determined by metering the gaseous phosgene making it possible to determine when sufficient phosgene has been admitted to the solution on a mol-for-mol basis. Actually, no harm is done if a molar excess of phosgene or a bischloroformate is used; however, an excess of the diphenolic acid will reduce the molecular weight due to incomplete reaction. In addition, a marked molecular excess of one reactant over the other creates a recovery problem due to the presence of the unreacted intermediate. Accordingly, it is most advantageous to react the diphenolic acid and the phosgene or bischloroformate in a substantially equimolar ratio.

Satisfactory polycarbonates are also formed in accordance with this invention wherein up to 95 mol percent of the diphenolic acid is substituted by a bisphenolic compound. The acid must be present to the extent of at least about 5 mol percent in order to form an alkali-soluble polycarbonate. The bisphenolic compounds which may be substituted for part of the diphenolic acid are members selected from the class consisting of bisphenols having the following formulas:

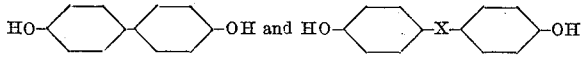

where X may be any group which does not take part in the reaction. Thus, the bisphenols are free from reactive groups other than the hydroxyphenyl groups under the conditions of the reaction and the hydroxyphenyl groups are the sole reactive groups capable of reacting with phosgene or the bischloroformates to form the carbonate polymer. Typical of such bisphenolic compounds are 4,4'-dihydroxy-diphenyl methane, 4,4-bis(p-hydroxyphenyl) n-heptane, 2,2-bis(p-hydroxyphenyl) propane, 2,2-bis(p-hydroxyphenyl) butane, 4,4'-dihydroxy-diphenyl sulfide, 4,4'-dihydroxy-diphenyl sulfone, 4,4-bis(p-hydroxyphenyl) butane-2, 1,1-bis(p-hydroxyphenyl) cyclohexane, and 4,4'-dihydroxy-diphenyl ether.

On completion of the reaction, the reaction medium may be acidified with an acid, such as hydrochloric acid, and the polycarbonate recovered as a precipitate from the aqueous reaction medium. The polymers thus prepared are alkali soluble and have intrinsic viscosities in dioxane in the range of about 0.1–0.4. The alkali-soluble polycarbonates are useful in emulsion-type polishes, and solutions of the polycarbonates in organic solvents, such as dioxane, may be readily cast into tough, hard films on surfaces, such as glass.

The following examples illustrate several embodiments of the invention. All parts are by weight unless otherwise stated.

Example 1

Into a 4-liter beaker was placed 100 grams of 4,4-bis(p-hydroxyphenyl) pentanoic acid, 3 liters of distilled water, and sufficient sodium hydroxide to raise the pH of the solution to 10.5. The solution was stirred at room temperature and 102 grams of diethylene glycol dichloroformate was added dropwise during a period of about 45 minutes. During addition of the dichloroformate, dilute aqueous sodium hydroxide was added to the reaction medium so as to maintain the pH at 10–10.5. Near the completion of the dichloroformate addition, the pH was allowed to reach 7–8 and, after the addition was completed, the mixture was stirred for 15 minutes and then acidified with dilute hydrochloric acid. A white polymer was precipitated. In dioxane solution, the polymer gave an intrinsic viscosity value of 0.33.

Example 2

In a 1-liter, 5-necked flask fitted with a stirrer, glass inlet and outlet ports, thermometer, dropping funnel, glass electrode, and calomel electrode was placed 7.15 grams of 4,4-bis(p-hydroxyphenyl) pentanoic acid, 5.70 grams of Bisphenol-A, 600 milliliters of water, and 7.0 grams of sodium hydroxide. To the vigorously stirred solution at 25° C. was added phosgene at the rate of 1/10 of a liter per minute. During the phosgene addition, the pH of the reaction medium as determined by a pH meter was maintained at 10–11 by addition of a 20% aqueous solution of sodium hydroxide from the dropping funnel. After 30 minutes, the phosgene addition was stopped and the reaction medium was poured into dilute hydrochloric acid. A white polymer precipitated from the aqueous medium and was collected by filtration, washed with water, and dried. The product softened at 170°–180° C. and gave an intrinsic viscosity value of 0.29 in dioxane.

A film of the polymer cast on glass from dioxane solution was hard, tough, and colorless and adhered strongly to the glass.

Example 3

The procedure of Example 2 was repeated except that the pH of the reaction medium was maintained at 9–10 rather than at 10–11. The resultant product was insoluble in dioxane, chloroform, and other organic solvents and resisted attempts to disperse it in aqueous alkaline mediums. It was assumed cross linking occurred at the lower pH through some unknown mechanism to produce a gel.

Example 4

The procedure of Example 2 was again repeated except that the pH of the reaction medium in this instance was maintained at 11–12. The resultant product was soluble in dioxane but gave a film on glass that was both brittle and which had poor adhesion. This polymer gave an intrinsic viscosity value of less than 0.1 in dioxane.

Example 5

The procedure of Example 2 was reported except that in place of the 7.15 grams of 4,4-bis(p-hydroxyphenyl) pentanoic acid and the 5.70 grams of Bisphenol-A, 11.4 grams of Bisphenol-A was utilized as the sole diphenolic ingredient. Isolation of the product in this instance gave a gummy mass.

Example 6

The procedure of Example 2 was repeated except that the phenolic monomers consisted of 2.86 grams of 4,4-bis(p-hydroxyphenyl) pentanoic acid and 12.0 grams of methyl, 4,4-bis(p-hydroxyphenyl) pentanoate. The pH of the reaction medium was maintained at 10–11 during the phosgene addition. Isolation of the product on hydrochloric acid addition gave a white precipitate of polymer which was soluble in dioxane and yielded a clear, tough film strongly adhered to glass. The polymer had an intrinsic polymer value of 0.33 in dioxane.

Example 7

To a stirred mixture of 35.8 grams of 4,4-bis(p-hydroxyphenyl) pentanoic acid, 28.6 grams of Bisphenol-A, and 2,600 milliliters of water was added sufficient sodium hydroxide to bring the pH to 10.5. Sixty-four grams of diethylene glycol dichloroformate was added dropwise to the rapidly stirred mixture at room temperature. The addition of diethylene glycol dichloroformate required approximately one hour. During the addition, the reaction medium was maintained at a pH of 10–11 by addition of a 20% aqueous solution of sodium hydroxide, a total of 25 grams of sodium hydroxide being used during the addition. After the addition was complete, the product was precipitated by addition of dilute hydrochloric acid and the polymer was then filtered off, washed, and dried. The dried product was soluble in dioxane. Evaporation of a dioxane solution of the polymer on a glass deposited a hard, colorless film.

The products of Examples 1, 2, 6, and 7 are useful as the alkali-soluble resin component for dry, bright floor polish formulations. By way of example, the product from Example 7 was dissolved in aqueous alkali and then formulated into a self-polishing floor finish as follows:

To a warm (70° C.), stirred mixture of 10 parts of resin and 35 parts of water was added dropwise a solution of 0.35 parts of sodium hydroxide in 7 parts of water. The clear solution at a pH value of 8.8 was cooled and diluted with water until the resin content was equal to 18 weight percent of the resin solution. To 40 parts of the resin solution was added an emulsion of 18 parts of a polystyrene polymer in 82 parts of water. To the resultant, stirred mixture was added 3 parts of tributoxy ethylphosphate, 0.2 parts of an alkyl phenoxy polyoxyethylene ethanol surfactant, 0.35 parts of a methyl silicone polymer emulsion at 35% nonvolatile content, and 0.5 parts of a 1% aqueous solution of an anionic fluorine-containing surfactant. The self-polishing formulation on vinyl tile displayed good leveling, water-spot resistance, high gloss, and good wear properties.

I claim:
1. An alkali soluble polycarbonate prepared by the reaction of, in an aqueous medium at a pH of from about 10–11,
(a) a member the sole reactive groups of which are, under the conditions of the condensation reaction, the phenyl hydroxy groups, said member being selected from the class consisting of a diphenolic acid and a mixture of bisphenols of which at least 5 mol percent is a diphenolic acid, said diphenolic acid being of the formula

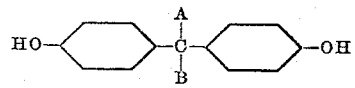

wherein A is a member selected from the class consisting of —H and an alkyl radical, and B is a member selected from the class consisting of —COOH and —RCOOH where R is an alkylene radical with
(b) a member selected from the class consisting of phosgene and a bischloroformate having the two chloroformate groups as the sole reactive groups capable of reacting with (a) under the conditions of the reaction.

2. A polycarbonate in accordance with claim 1 in which (a) and (b) are reacted in a mol-for-mol ratio.

3. A method of forming an alkali soluble polycarbonate which consists of reacting, in an aqueous medium at a pH of from about 10–11,
(a) a member the sole reactive groups of which are, under the conditions of the condensation reaction, the phenyl hydroxy groups, said member being selected from the class consisting of a diphenolic acid and a mixture of bisphenols of which at least 5 mol percent is a diphenolic acid, said diphenolic acid being of the formula

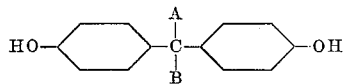

wherein A is a member selected from the class consisting of —H and an alkyl radical, and B is a member selected from the class consisting of —COOH and —RCOOH where R is an alkylene radical with
(b) a member selected from the class consisting of phosgene and a bischloroformate having the two chloroformate groups as the sole reactive groups capable of reacting with (a) under the conditions of the reaction.

4. A method in accordance with claim 3 in which (a) and (b) are reacted in a mol-for-mol ratio.

References Cited by the Examiner
UNITED STATES PATENTS

| | | | |
|---|---|---|---|
| 2,950,266 | 8/1960 | Goldblum | 260—47 |
| 2,970,131 | 1/1961 | Moyer | 260—47 |
| 3,132,118 | 5/1964 | Butterworth | 260—47 |

OTHER REFERENCES

"Diphenolic Acid," S. C. Johnson & Sons, Inc., (9 pages) April 1958.

Noller: Chemistry of Organic Compounds, pp. 165–166, Saunders Company, Philadelphia (1957).

SAMUEL H. BLECH, *Primary Examiner.*

HAROLD N. BURSTEIN, NORMAN G. TORCHIN,
*Examiners.*

WILLIAM H. SHORT, J. C. MARTIN,
*Assistant Examiners.*